United States Patent
Hiwara et al.

(10) Patent No.: US 6,635,312 B2
(45) Date of Patent: Oct. 21, 2003

(54) METHOD FOR IMPROVING CRATER RESISTANCE OF PAINT FILMS

(75) Inventors: Atsunao Hiwara, Hiratsuka (JP); Toshihide Fujitani, Hiratsuka (JP)

(73) Assignee: Kansai Paint Co., Ltd., Amagasaki (JP)

( * ) Notice: Subject to any disclaimer, the term of this patent is extended or adjusted under 35 U.S.C. 154(b) by 0 days.

(21) Appl. No.: 10/195,388

(22) Filed: Jul. 16, 2002

(65) Prior Publication Data

US 2003/0087039 A1 May 8, 2003

(30) Foreign Application Priority Data

Jul. 26, 2001 (JP) .......................... 2001-226859

(51) Int. Cl.$^7$ ................................. B05D 1/02
(52) U.S. Cl. ................... 427/372.2; 427/421
(58) Field of Search ................. 427/372.2, 421

(56) References Cited

FOREIGN PATENT DOCUMENTS

CA    2127132    * 12/1995

OTHER PUBLICATIONS

Weh et al, Plaste und Kautschuk, 20(11), pp 849–860, 1973.*

Kooistra, Proc.—Int. Conf. Org. Coat. Sci. Technol., 3, pp 263–278, 1977.*

Korum, FATIPEC Congress, 14, pp 329–336, 1978.*

Akui et al, Shikizai Kyokaishi, 63(4), pp 198–204, 1990.*

Evans et al, Journal of Colloid and Interface Science, 227(1), pp 191–205, 2000.*

Tadaaki Satoh et al., "Studies on Cratering in Pain Films (IV)," Journal of the Japan Society of Colour Material vol. 47, No. 9, 1974, pp. 19–26 & its English abstract.

Eiji Kuwano et al., "A Study on Paint Surface Viscoelasticity Change Caused by Additives," Research on Coatings No. 136, Apr. 2001, pp. 9–16 & its summary translation.

Atsunao Hiwara et al, "Effect of Additives on Cratering of Paint Film," Research for Coatings No. 127, Oct., 1996, pp. 2–9 & its partial translation.

* cited by examiner

*Primary Examiner*—Erma Cameron
(74) *Attorney, Agent, or Firm*—Armstrong, Westerman & Hattori, LLP

(57) ABSTRACT

The present invention provides a method for providing a paint film with improved cratering resistance, comprising making adjustments in the application of a liquid paint to a substrate so that the wet paint film immediately after application has a viscosity of 0.2 to 1.0 Pa·s at a strain rate of 5 sec$^{-1}$ at 20° C., as measured by the static flow method, and has a storage modulus/loss modulus ratio within the range of 0.1 to 0.25 at an angular frequency of 10 rad/sec at 20° C., as measured by the oscillation method.

6 Claims, No Drawings

METHOD FOR IMPROVING CRATER RESISTANCE OF PAINT FILMS

BACKGROUND OF THE INVENTION (1) Field of the Invention

The present invention relates to a method for improving crater resistance of paint films.

(2) Description of the Related Art

Cratering in paint films, which occurs with the application of a paint, is a serious paint film defect and has been a problem to be overcome in the paint industry.

Cratering is a phenomenon in which bowl shaped depressions are formed on the surface of a paint film when a liquid paint is applied to a substrate. When severe, cratering produces holes so deep as to expose the substrate. Various factors cause cratering. It is generally believed that factors, such as 1) rapid evaporation of a solvent from part of the wet paint film immediately after application of a paint, 2) influence of residual monomers and additives contained in the paint, 3) contaminant dusts in the film from the atmosphere, and 4) oil fouling on the substrate, cause the formation of a lower surface tension "trigger" portion on the film surface, and expansion of this trigger portion results in cratering.

With respect to crater resistance of paint films, Satoh et al., "Journal of the Japan Society of Colour Material", Vol. 47, No. 9, pp. 19–26 (1974) describes the following: The cratering tendency of a paint depends on its flow properties. The lower the residual viscosity is and the larger the yield value K is, the stronger the cratering tendency is.

E. Kuwano et al., "Research on Coatings", No. 136, April, pp. 9–16 (2001) describes the following: Continuous surface film with a large storage modulus G' is resistant to cratering. When paint additives such as leveling agents are added, the surface storage modulus G' increases.

A. Hiwara et al., "Research on Coatings", No. 127, October, pp. 2–9 (1996) describes the following: The storage modulus/loss modulus (G'/G") ratio of a paint relates to cratering tendency of the paint. The higher this ratio is, the higher the crater resistance is.

However, there is no known method that can effectively improve the crater resistance of a paint film, regardless of the kind of liquid paint used.

BRIEF SUMMARY OF THE INVENTION

An object of the invention is to provide a novel method for improving crater resistance of the paint films of various liquid paints which vary in their resin component, pigment component, etc.

The present inventors carried out a variety of studies on the effects of viscosity and elasticity of liquid paints on the occurrence or degree of cratering in the paint films. The inventors found that in the application of a liquid paint to a substrate, when adjustments are made in such a manner a wet paint film immediately after application has a specific level of viscosity and a storage modulus (G')/loss modulus (G") ratio within a specific range, the paint film exhibits highly improved crater resistance. The present invention was accomplished based on this finding.

The present invention provides the following methods for improving the crater resistance of paint films.

1. A method for providing a paint film with improved cratering resistance, comprising making adjustments in the application of a liquid paint to a substrate in such a manner that the wet paint film immediately after application has a viscosity of 0.2 to 1.0 Pa·s at a strain rate of 5 sec$^{-1}$ at 20° C., as measured by the static flow method, and has a storage modulus/loss modulus (G'/G") ratio within the range of 0.1 to 0.25 at an angular frequency of 10 rad/sec at 20° C., as measured by the oscillation method.

2. The method according to item 1 wherein the viscosity and the G'/G" ratio are measured at a point of time from about 0.5 minutes to about 3 minutes after application.

3. The method according to item 1 wherein the adjustments are made by at least one of the following means: modification of the liquid paint composition before application; modification of the coating process; and modification of coating conditions.

4. The method according to item 1 wherein the adjustments are made in such a manner that the wet paint film immediately after application has a viscosity of 0.4 to 1.0 Pa·s and a storage modulus/loss modulus (G'/G") ratio within the range of 0.12 to 0.22.

5. The method according to item 3 wherein the modification of the liquid paint composition before application of the paint is carried out using at least one of the following means: addition of a fluidity regulator; addition of a solvent; and adjustment of the paint pigment concentration.

6. The method according to item 3 wherein the modification of the coating process is the use of spray coating in place of other processes.

DETAILED DESCRIPTION OF THE INVENTION

There is no limitation on the substrate used in the method of the invention. Examples of substrates include metal substrates (sheets, plates or molded articles) such as iron plates, aluminium plates, stainless steel plates, zinc plated steel sheets, zinc alloy plated steel sheets and tin plates; surface treated metal substrates formed by treating the surface of the above-mentioned metal substrates with phosphate, chromate, complex oxide or the like; plastic substrates; inorganic ceramic substrates such as glass, cement, slate, mortar, concrete and tile; paper; and coated substrates produced by coating the above-mentioned substrates. Examples of zinc alloy plated steel sheets are steel sheets plated with an alloy such as iron/zinc, nickel/zinc or aluminium/zinc.

The liquid paint used in the invention can be an organic solvent paint or an aqueous paint comprising a resin, optionally with a curing agent.

Usable as the resin of the liquid paint is any known paint resin. Representative examples include acrylic resins, polyester resins, alkyd resins, epoxy resins, polyamide resins, silicone polyester resins, silicone acrylic resins, fluorine resins, epoxy resins, and modified resins thereof. These resins can be used singly or in combinations of two or more, and can be used in combination with curing agents. Examples of curing agents include amino resins such as melamine resins, epoxy compounds, polyamine compounds, polyisocyanate compounds and blocked polyisocyanate compounds. It is also possible to use a combination of an epoxy-containing acrylic resin and a carboxyl-containing acrylic resin.

The paint can be a clear paint or a colored paint comprising a coloring pigment and/or a luster pigment. If necessary, the paint may contain other pigments such as extender pigments.

Examples of coloring pigments include inorganic pigments such as titanium dioxide and iron oxide; and organic pigments such as phthalocyanine blue, quinacridone red, perylene red and phthalocyanine green. Examples of luster pigments include aluminium flakes and mica flakes. Examples of extender pigments include barium sulfate, calcium carbonate, talc and clay.

When the liquid paint is an organic solvent paint, useful organic solvents include, for example, xylene, toluene, ethyl acetate, isobutyl acetate, ethanol, butanol, cyclohexanol, methyl ethyl ketone, methyl isobutyl ketone, ethylene glycol monobutyl ether and propylene glycol monomethyl ether. It is usually appropriate that the solids concentration of the organic solvent paint be about 20 wt. % to about 70 wt. %.

When the liquid paint is an aqueous paint, water or a mixed solvent of water and an aqueous organic solvent can be used as the solvent. Examples of aqueous organic solvents include ethylene glycol monobutyl ether, propylene glycol monomethyl ether, ethanol, butanol and isopropanol. It is usually appropriate that the solids concentration of the aqueous paint be about 20 wt. % to about 70 wt. %.

In the method of the invention, the liquid paint can be applied to a substrate by a coating process such as air spray coating, rotary spraying, airless spray coating, roll coating, brush coating, curtain coating and dip coating. Particularly preferred are spray coating processes such as air spray coating, rotary spraying and airless spray coating. These spray coating processes can be carried out by electrostatic spray coating.

The viscosity of the liquid paint is preferably adjusted, before spray coating, to, for example, about 15 to about 40 seconds (Ford Cup #4/20° C.) using the above-mentioned solvent.

The amount of the liquid paint applied to the substrate is about 20 to about 70 g/m$^2$, preferably about 30 to about 50 g/m$^2$.

In the application of a liquid paint to a substrate, the method of the invention can effectively prevent cratering in the paint film by making adjustments so that a wet paint film immediately after application has a viscosity of 0.2 to 1.0 Pa·s at a strain rate of 5 sec$^{-1}$ at 20° C., as measured by the static flow method, and has a storage modulus/loss modulus (G'/G") ratio within the range of 0.1 to 0.25 at an angular frequency of 10 rad/sec at 20° C., as measured by the oscillation method.

When the viscosity of the wet paint film is less than 0.2 Pa·s, the paint film has poor crater resistance and expansion of craters can not be fully prevented. On the other hand, when the viscosity is more than 1.0 Pa·s, the paint film tends to have a severely uneven surface and poor surface smoothness. When the storage modulus/loss modulus (G'/G") ratio is lower than 0.1, the paint film has poor crater resistance and expansion of craters can not be fully prevented. When the storage modulus/loss modulus (G'/G") ratio is higher than 0.25, the paint film tends to have a severely uneven surface and poor surface smoothness.

Preferably, adjustments are made so that the wet paint film immediately after application has a viscosity of 0.4 to 1.0 Pa·s at a strain rate of 5 sec$^{-1}$ at 20° C., as measured by the static flow method, and a storage modulus/loss modulus (G'/G") ratio within the range of 0.12 to 0.22 at an angular frequency of 10 rad/sec at 20° C., as measured by the oscillation method.

The viscosity, storage modulus G' and loss modulus G" of the wet paint film immediately after application can be easily determined by using wet paint film scraped off of the substrate.

In the method of the invention, the time meant by "immediately after application" may slightly vary depending on the contents of the liquid paint such as solvent, resin, etc. The viscosity and the G'/G" ratio are usually measured at a point of time from about 0.5 to about 3 minutes after application, preferably about 1 to about 1.5 minutes after application.

A variety of known measurement instruments can be used to measure the viscosity at a strain rate of 5 sec$^{-1}$ by the static flow method and the storage modulus/loss modulus (G'/G") ratio at an angular frequency of 10 rad/sec by the oscillation method. Useful instruments include, for example, the Haake viscometer "Rheometer RS 150".

The viscosity and the G'/G" ratio of the wet paint film immediately after application can be adjusted to the ranges of the invention using a means such as modification of the liquid paint composition before application, modification of the coating process or modification of coating conditions.

Examples of means for modification of the liquid paint composition before application are addition of a fluidity regulator, addition of a solvent, and adjustment of the paint pigment concentration. Preferably, at least one of the above-mentioned means is used to adjust the viscosity and the G'/G" ratio of the wet paint film immediately after application.

Examples of fluidity regulators include silica powders, bentonite-containing regulators, atomized barium sulfate powders, polyamide-containing regulators, fine organic resin particles and diurea-containing regulators. These regulators can be used singly or in combinations of two or more. Particularly preferred are fine organic resin particles and diurea-containing fluidity regulators.

It is preferable that the fine organic resin particles have an average particle diameter of about 1 nm to about 1 μm, preferably about 50 nm to about 500 nm. The kind of resin can be, for example, nylon 11, nylon 12 or like nylons; carboxylic acid modified polyethylene or like modified polyethylenes; maleinated polypropylene or like modified polypropylenes; polyethylene, polypropylene, polytetrafluoroethylene, silicon rubber, acrylic resin, urethane resin, phenolic resins, etc. The amount of organic resin fine particles is usually 2 parts by weight or less per 100 parts by weight of nonvolatile components in the paint.

Representative examples of acrylic resin fine particles are internally crosslinked particles which are produced by emulsion polymerization of polymerizable unsaturated monomer components comprising multifunctional monomers in the presence of a reactive emulsifier having a polymerizable unsaturated group (e.g., allyl), using a water-soluble polymerization initiator such as a water-soluble azoamide compound. Examples of multifunctional monomers include those having 2 or more polymerizable unsaturated groups such as divinylbenzene, 1,6-hexanediol dimethacrylate and the like.

Preferred examples of the diurea-containing fluidity regulator include reaction products of primary monoamines and diisocyanates. The amount of the fluidity regulator is usually 2 parts by weight or less per 100 parts by weight of nonvolatile components of the paint.

The addition of such a fluidity regulator can provide a wet paint film immediately after application with an increased viscosity and an increased storage modulus/loss modulus (G'/G") ratio.

Solvents useful for modification of the paint composition include water and known organic solvents conventionally used in paints.

The viscosity and the G'/G" ratio of the wet paint film can be adjusted by the addition of a solvent in the following manner. When the viscosity of the wet paint film immediately after application is less than 0.2 Pa·s and the storage modulus/loss modulus (G'/G") ratio is lower than 0.1, addition of a solvent with a higher volatilization rate, i.e., compositional modification of the solvent to achieve a higher volatilization rate can increase the viscosity and the G'/G" ratio. When the viscosity of the wet paint film immediately after application is more than 1.0 Pa·s and the G'/G" ratio is higher than 0.25, addition of a solvent with a lower volatilization rate, i.e., compositional modification of the solvent to achieve a lower volatilization rate can reduce the viscosity and the G'/G" ratio.

The viscosity and G'/G" ratio of the wet paint film can be adjusted by adjustment of the paint pigment concentration in the following manner. The addition of a paint pigment paste having the same composition as the paint pigment increases the pigment concentration relative to the resin in the liquid paint, whereby the wet paint film is provided with an increased viscosity and an increased G'/G" ratio. The addition of a pigment-free clear paint lowers the pigment concentration relative to the resin in the liquid paint, whereby the wet paint film is provided with a reduced viscosity and a reduced ratio of G'/G".

The modification of the coating process to adjust the viscosity and G'/G" ratio of the wet paint film can be, for example, using spray coating instead of other coating processes. In spray coating, a considerable amount of solvent evaporates before atomized paint particles have reached and attached to the surface of a substrate. Therefore, when the same paint is used, spray coating, as compared to other coating processes, can increase the viscosity and the G'/G" ratio of the wet paint film immediately after application.

The modification of coating conditions to adjust the viscosity and G'/G" ratio of the wet paint film can be, for example, use of increased air pressure in spray coating. By increasing the air pressure, a more finely atomized paint can be sprayed, which accelerates the volatilization of the solvent during the coating process, so that the wet paint film immediately after application is provided with an increased viscosity and an increased G'/G" ratio.

The wet paint film whose viscosity and G'/G" ratio are adjusted by the invention is dried or cured by heating, thus providing a paint film with highly improved crater resistance.

EXAMPLES

The following Production Examples and Examples are provided to illustrate the present invention in further detail. In these examples, parts and percentages are all by weight.

Production Example 1

A mixture of 20 parts of a quinacridone red pigment (trade name "Rubicron Red 451R", product of Tosoh Co., Ltd.), 20 parts (on a solids basis) of an alkyd pigment dispersion resin with an acid value of about 6 mgKOH/g and a hydroxyl value of about 68 mgKOH/g, and 57 parts of xylene was dispersed in a paint shaker using 1 mm glass beads as dispersion media for 2 hours, giving a red pigment paste with a solids content of 41%.

Production Example 2

A mixture of 20 parts of a phthalocyanine blue pigment (trade name "CYANINE BLUE 5240K", product of Dainichiseika Color & Chemicals Mfg. Co., Ltd.), 20 parts (on a solids basis) of an alkyd pigment dispersion resin with an acid value of about 6 mgKOH/g and a hydroxyl value of about 68 mgKOH/g, and 24 parts of xylene was dispersed in a paint shaker using 1 mm glass beads as dispersion media for 2 hours, giving a blue pigment paste with a solids content of 62.5%.

Production Example 3

An acrylic resin surface-finishing agent (trade name: "Disparlon LC955", product of Kusumoto Chemicals, Ltd.) (0.4 parts) was mixed with a resin solution containing 70 parts (on a solids basis) of an alkyd resin with an acid value of about 4 mgKOH/g and a hydroxyl value of about 130 mgKOH/g, 30 parts (on a solids basis) of a butyl etherized melamine resin, 56 parts of xylene, 35 parts of n-butanol and 9 parts of methyl ethyl ketone, giving a clear alkyd resin solution.

Example 1

The red pigment paste obtained in Production Example 1 (12 parts, 24 parts or 48 parts) was added to 200 parts of the clear alkyl resin solution obtained in Production Example 3. These mixtures were diluted with xylene to a viscosity of 23 seconds (Ford Cup #4/20° C.).

The resulting three paints, 250 g each, were placed into 500 cc beakers and stirred with a magnetic stirrer in a 20° C. thermostatic chamber for 48 hours so that a depression about 10 mm deep was formed in the center of stirring. Then, 80 parts each of the paints were sampled from the center of the depression and each sample was applied to 3 tin plates (40 cm×50 cm) by air spraying to form a coating film of 35 g/m$^2$. A total of 9 test plates, 3 for each sample, were thereby prepared.

One minute after application, the wet paint film was scraped off of one of the three plates of each sample using a scraper. Using the Haake viscometer "Rheometer RS 150", the storage modulus/loss modulus (G'/G") ratio was measured at an angular frequency of 10 rad/sec by the oscillation method and the viscosity was measured at a strain rate of 5 sec$^{-1}$ by the static flow method. The other two plates of each sample were heated at 140° C. for 20 minutes to cure the wet paint films. The number of craters was counted and coating surface smoothness was evaluated. The total number of craters in the cured paint films on the 2 tin plates was counted. The coating surface smoothness was observed with the naked eye and given a "good" rating when the surface was fairly even and had a good smoothness.

Table 1 shows the amount of red pigment paste added, viscosity, G'/G" ratio, total number of craters on the 2 tin plates and coating surface smoothness.

TABLE 1

| Amount of red pigment paste | 12 parts | 24 parts | 48 parts |
| --- | --- | --- | --- |
| Viscosity (Pa · s) | 0.59 | 0.61 | 0.62 |
| G'/G" | 0.05 | 0.06 | 0.20 |
| Number of craters | 3 | 1 | 0 |
| Coating surface smoothness | Good | Good | Good |

Table 1 clearly shows that when 48 parts of a red pigment paste was added to 200 parts of a clear alkyd resin solution, the wet paint film immediately after application had a viscosity of 0.62 Pa·s and a G'/G" ratio of 0.20 and no cratering occurred on the painted plates.

Example 2

The blue pigment paste obtained in Production Example 2 (32 parts, 48 parts or 64 parts) was added to 200 parts of the clear alkyl resin solution obtained in Production Example 3. These mixtures were diluted with xylene to a viscosity of 23 seconds (Ford cup #4/20° C.). Using the resulting three blue paints, measurements of the G'/G" ratio and viscosity, counting of the craters and evaluation of the coating surface smoothness were carried out in the same manner as in Example 1.

Table 2 shows the amount of blue pigment paste added, viscosity, G'/G" ratio, total number of craters on the 2 tin plates and coating surface smoothness. As shown in Table 2, a large number of craters occurred in all of the samples.

TABLE 2

| Amount of blue pigment paste | 32 parts | 48 parts | 64 parts |
|---|---|---|---|
| Viscosity (Pa · s) | 0.70 | 0.52 | 0.55 |
| G'/G" | 0.01 | 0.03 | 0.04 |
| Number of craters | 95 | 53 | 40 |
| Coating surface smoothness | Good | Good | Good |

Then, a diurea-containing fluidity regulator (an addition product of a diisocyanate compound and a primary monoamine)(0 part, 0.5 parts, 1.0 part, 1.5 parts or 2.0 parts, based on the active ingredient) was added to 232 parts of a blue paint consisting of 200 parts of the clear alkyl resin solution obtained in Production Example 3 and 32 parts of the blue pigment paste obtained in Production Example 2. These mixtures were diluted with xylene to a viscosity of 23 seconds (Ford cup #4/20° C.). Using the resulting five paints, measurements of the G'/G" ratio and viscosity, counting of the craters and evaluation of the coating surface smoothness were carried out in the same manner as in Example 1. Table 3 shows the results.

TABLE 3

| Amount of fluidity regulator | 0 part | 0.5 parts | 1.0 part | 1.5 parts | 2.0 parts |
|---|---|---|---|---|---|
| Viscosity (Pa · s) | 0.70 | 0.51 | 0.43 | 0.48 | 0.55 |
| G'/G" | 0.01 | 0.02 | 0.03 | 0.08 | 0.20 |
| Number of Craters | 95 | 94 | 35 | 1 | 0 |
| Coating surface smoothness | Good | Good | Good | Good | Good |

Table 3 clearly shows the following results: When blue paint diluted with xylene (containing 0 parts of a fluidity regulator) was used, a large number of craters occurred on the painted plates. When a diurea-containing fluidity regulator (2.0 parts based on the active ingredient) was added to 232 parts of the blue paint, the wet paint film immediately after application had a viscosity of 0.55 Pa·s and a G'/G" ratio of 0.20, and a crater-free painted plate was obtained.

Example 3

A blue paint (232 parts) consisting of 200 parts of the clear alkyl resin solution obtained in Production Example 3 and 32 parts of the blue pigment paste obtained in Production Example 2 was diluted with the following three types of solvents to a viscosity of 23 seconds (Ford cup #4/20° C.): xylene alone; a mixed solvent I of 80 parts of xylene and 20 parts of acetone; and a mixed solvent II of 50 parts of xylene and 50 parts of acetone. Using the resulting three paints, measurements of the G'/G" ratio and viscosity, counting of the craters and evaluation of the coating surface smoothness were carried out in the same manner as in Example 1. Table 4 shows the results.

TABLE 4

| Dilution solvent | Xylene | Mixed solvent I | Mixed solvent II |
|---|---|---|---|
| Amount of solvent per 232 parts of blue paint | 43 parts | 43 parts | 46 parts |
| Viscosity (Pa · s) | 0.70 | 0.60 | 1.10 |
| G'/G" | 0.01 | 0.21 | 0.29 |
| Number of craters | 95 | 0 | 0 |
| Coating surface smoothness | Good | Good | Poor |

Table 4 clearly shows the following results: When the blue paint (200 parts of a clear alkyl resin solution+32 parts of a blue pigment paste) diluted with xylene alone to adjust the viscosity was applied, a large number of craters occurred on the painted plates. In contrast, when a mixed solvent of 80 parts of xylene and 20 parts of acetone was used as the dilution solvent, the wet paint film immediately after application had a viscosity of 0.60 Pa·s and a G'/G" ratio of 0.21, and the resulting painted plate was free of craters and had a good surface smoothness.

The method of the invention is a simple and convenient method comprising making adjustments in the application of a liquid paint to a substrate so that the wet paint film immediately after application has a specific level of viscosity at a strain rate of 5 sec$^{-1}$ at 20° C. and a surface storage modulus/surface loss modulus (G'/G") ratio within a specific range at an angular frequency of 10 rad/sec at 20° C. The method of the invention thereby achieves the following remarkable effect: regardless of the kind of paint used, a crater-free coating can be formed.

What is claimed is:

1. A method for providing a paint film with improved cratering resistance, comprising making adjustments in the application of a liquid paint to a substrate in such a manner that the wet paint film immediately after application has a viscosity of 0.2 to 1.0 Pa·s at a strain rate of 5 sec$^{-1}$ at 20° C., as measured by the static flow method, and has a storage modulus/loss modulus (G'/G") ratio within the range of 0.1 to 0.25 at an angular frequency of 10 rad/sec at 20° C., as measured by the oscillation method.

2. The method according to claim 1 wherein the viscosity and the G'/G" ratio are measured at a point of time from about 0.5 minutes to about 3 minutes after application.

3. The method according to claim 1 wherein the adjustments are made by at least one of the following means: modification of the liquid paint composition before application; modification of the coating process; and modification of coating conditions.

4. The method according to claim 1 wherein the adjustments are made in such a manner that the wet paint film immediately after application has a viscosity of 0.4 to 1.0 Pa·s and a storage modulus/loss modulus ratio within the range of 0.12 to 0.22.

5. The method according to claim 3 wherein the modification of the liquid paint composition before application of the paint is carried out using at least one of the following means: addition of a fluidity regulator; addition of a solvent; and adjustment of the paint pigment concentration.

6. The method according to claim 3 wherein the modification of the coating process is the use of spray coating in place of other processes.

* * * * *